United States Patent
Oh et al.

(10) Patent No.: US 12,416,903 B2
(45) Date of Patent: Sep. 16, 2025

(54) AI-BASED REAL-TIME ENERGY MANAGEMENT SYSTEM FOR PEAK POWER MANAGEMENT AND ENERGY EFFICIENCY IN LOGISTICS CENTERS

(71) Applicants: Korea Conformity Laboratories, Seoul (KR); Algorigo Inc., Seoul (KR)

(72) Inventors: Jaeyoung Oh, Seoul (KR); Kyunghoon Jang, Seoul (KR); Gilhwan Cha, Seoul (KR); Jaehong Yoo, Seoul (KR); Jaehyun Yoo, Seoul (KR); Kyungsu Choi, Seoul (KR)

(73) Assignees: Korea Conformity Laboratories, Seoul (KR); Algorigo Inc., Seoul (KR)

( * ) Notice: Subject to any disclaimer, the term of this patent is extended or adjusted under 35 U.S.C. 154(b) by 0 days.

(21) Appl. No.: 18/979,963

(22) Filed: Dec. 13, 2024

(65) Prior Publication Data
US 2025/0208594 A1    Jun. 26, 2025

(30) Foreign Application Priority Data
Dec. 21, 2023 (KR) .......... 10-2023-0188955

(51) Int. Cl.
*G05B 19/042* (2006.01)

(52) U.S. Cl.
CPC .... *G05B 19/042* (2013.01); *G05B 2219/2614* (2013.01); *G05B 2219/2639* (2013.01)

(58) Field of Classification Search
CPC .......... G05B 19/042; G05B 2219/2614; G05B 2219/2639
See application file for complete search history.

(56) References Cited

U.S. PATENT DOCUMENTS

2024/0380215 A1* 11/2024 Julien ................. H02J 7/0013

FOREIGN PATENT DOCUMENTS

| CN | 114928085 A * | 8/2022 | ............... H02J 3/32 |
| JP | 2016152747 A * | 8/2016 | |
| KR | 20150009375 A | 1/2015 | |
| KR | 102088532 B1 | 3/2020 | |
| KR | 20200109112 A | 9/2020 | |
| KR | 102358798 B1 | 2/2022 | |
| KR | 20220040698 A | 3/2022 | |
| KR | 102444254 B1 | 9/2022 | |
| KR | 102549711 B1 | 6/2023 | |
| WO | WO-2014109020 A1 * | 7/2014 | ............. H02J 3/004 |

OTHER PUBLICATIONS

Notice of Preliminary Rejection of the KR counterpart application No. 10-2023-0188955 dated Mar. 11, 2024.
Notice of Final Rejection of the KR counterpart application No. 10-2023-0188955 dated Sep. 27, 2024.
Notice of Allowance of the KR counterpart application No. 10-2023-0188955 dated Nov. 25, 2024.

* cited by examiner

*Primary Examiner* — Michael W Choi
(74) *Attorney, Agent, or Firm* — Dinsmore & Shohl LLP

(57) ABSTRACT

Provided is an energy management system for peak power management and energy efficiency improvement in a logistics center including: a data collection server configured to collect data for performing energy management of the logistics center; and an energy management server configured to output an energy operation guide for the logistics center using the collected data.

4 Claims, 8 Drawing Sheets

AI-BASED REAL-TIME ENERGY MANAGEMENT SYSTEM FOR PEAK POWER MANAGEMENT AND ENERGY EFFICIENCY IN LOGISTICS CENTERS

CROSS-REFERENCE TO RELATED APPLICATIONS

This application claims priority to and the benefit thereof under 35 U.S.C. § 119 to Korean Patent Application No. 10-2023-0188955 filed in the Korean Intellectual Property Office on Dec. 21, 2023, the entire contents of which are incorporated herein by reference.

BACKGROUND

(a) Field

The disclosure relates to an AI-based real-time energy management system for peak power management and enhancing energy efficiency of a logistics center, and more specifically, to an AI-based real-time energy management system for maximizing energy efficiency by flexibly managing peak power based on power demand prediction and solar power prediction.

(b) Description of the Related Art

As national income increases, demand for higher quality food has risen, bringing attention to cold chain industry for supporting the demand. Particularly, in case of fresh logistics or various vaccines, shelf life is very short, and storage temperatures differ greatly by product compared to general industrial goods. Thus, cold chain logistics center consumes a large amount of energy to store such products.

Meanwhile, an energy management system (EMS) refers to a management system that sets goal of improving energy efficiency and systematically and continuously implements management protocols according to certain procedures and techniques to achieve the goal. Recently, with rapid popularization of artificial intelligence (AI) technology, various AI algorithms for operation and power demand prediction, are being applied to EMS.

Such EMS is also used in the operation of logistics centers, and recently, methods utilizing AI models for power demand prediction have been attempted to efficiently manage energy used within the logistics centers.

SUMMARY

Some embodiments may provide an energy management system that efficiently manages energy within logistics center by updating a peak power based on accuracy of predictions regarding power demand and solar power generation.

According to an aspect of an embodiment, an energy management system for peak power management and energy efficiency improvement in a logistics center may include: a data collection server configured to collect data for performing energy management of the logistics center; and an energy management server configured to output an energy operation guide for the logistics center using the collected data, wherein the energy management server is configured to: predict power demand of the logistics center and solar power generation within the logistics center based on the collected data; calculate prediction accuracy by comparing the predicted power demand and solar power generation with the collected data; update a first peak power to a second peak power by applying the prediction accuracy to the first peak power; and output the energy operation guide for the logistics center based on the second peak power, and wherein the energy management server is further configured to: cluster time-specific solar radiation by inputting time-specific cloud forecasts included in the collected data into a pre-trained artificial intelligence model; calculate a mean squared error (MSE) between the clustered time-specific solar radiation and actual solar radiation; calculate prediction accuracy of the solar power generation based on a comparison of the MSE with a preset reference value; and determine the second peak power based on the first peak power, the prediction accuracy of the power demand, the prediction accuracy of the solar power generation, and a preset ratio constant.

In some embodiments, wherein the outputting the energy operation guide for the logistics center based on the second peak power includes: outputting the energy operation guide for optimizing at least one of charging and discharging scheduling of an Energy Storage System (ESS) and operation of an air conditioning system within the logistics center.

In some embodiments, wherein the energy management server is further configured to: optimize the charging and discharging scheduling of the ESS based on a preset scheduling optimization criterion, wherein the scheduling optimization criterion includes at least one of: a first criterion that a current state of charge is similar to a previous state of charge, a second criterion of preventing complete discharge and complete charge, a third criterion of minimizing energy usage cost, and a fourth criterion that total power usage within the logistics center is less than or equal to the second peak power.

In some embodiments, wherein the energy management server is further configured to: optimize the operation of the air conditioning system based on a preset operation optimization criterion if the scheduling optimization criterion fails to meet the fourth criterion, wherein the operation optimization criterion includes at least one of: a fifth criterion that total power used within the logistics center is less than the second peak power, and a sixth criterion that set temperature of the air conditioning system meets a preset temperature condition.

According to an aspect of an embodiment, an energy management method performed by an energy management system for peak power management and energy efficiency improvement in a logistics center may include: predicting power demand of the logistics center and solar power generation within the logistics center based on collected data; calculating prediction accuracy by comparing the predicted power demand and solar power generation with the collected data; updating a first peak power to a second peak power by applying the prediction accuracy to the first peak power; and outputting an energy operation guide for the logistics center based on the second peak power, wherein the predicting the solar power generation includes: clustering time-specific solar radiation by inputting time-specific cloud forecasts included in the collected data into a pre-trained artificial intelligence model; calculating a mean squared error (MSE) between the clustered time-specific solar radiation and actual solar radiation; and calculating prediction accuracy of the solar power generation based on a comparison of the MSE with a preset reference value, and wherein the updating a first peak power to a second peak power includes: determining the second peak power based on the first peak power, the prediction accuracy of the power demand, the prediction accuracy of the solar power generation, and a preset ratio constant.

In some embodiments, wherein the outputting the energy operation guide for the logistics center based on the second peak power includes: outputting the energy operation guide for optimizing at least one of charging and discharging scheduling of an Energy Storage System (ESS) and operation of an air conditioning system within the logistics center.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure will become apparent from the following description taken in conjunction with the accompanying drawings, in which.

DETAILED DESCRIPTION OF THE INVENTION

Figure 1:
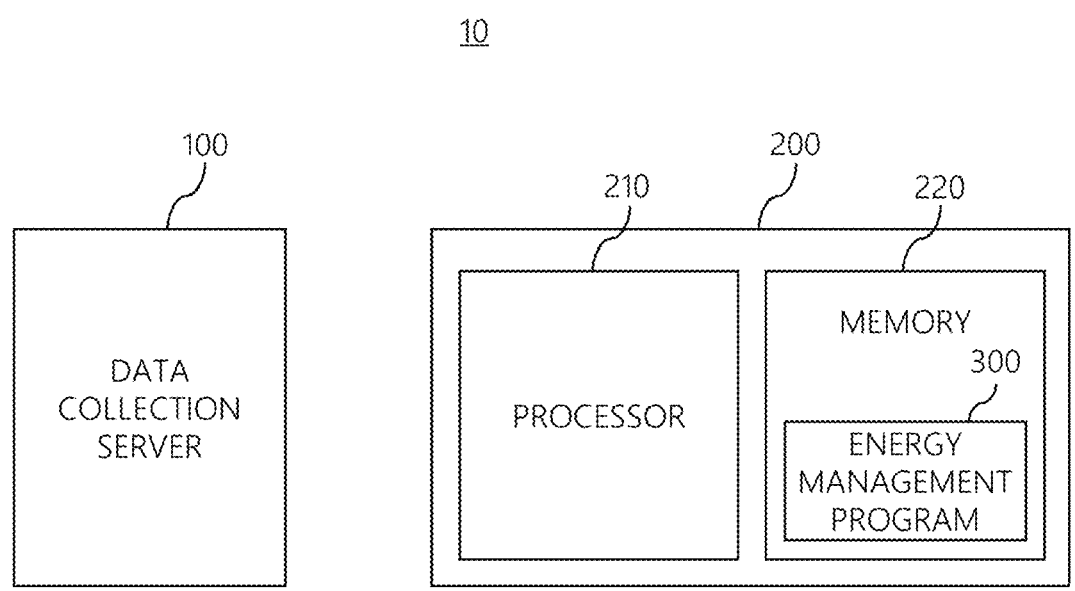
FIG. 1 illustrates a block diagram of an energy management system according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

As used herein, each of such phrases as "A or B," "at least one of A and B," "at least one of A or B," "A, B, or C," "at least one of A, B, and C," and "at least one of A, B, or C," may include any possible combination of the items enumerated together in a corresponding one of the phrases.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

Hereinafter, various embodiments of the present disclosure are described with reference to the accompanying drawings.

Overview of an Energy Management System of a Logistics Center

FIG. 1 illustrates a block diagram of an energy management system of a logistics center according to an embodiment.

Referring to FIG. 1, an energy management system (EMS) 10 according to an embodiment of the present disclosure is a system for performing energy management, such as charging and/or discharging energy, and peak power management in a logistics center, and may include a data collection server 100 and an energy management server 200.

Here, the energy management system shown in FIG. 1 may be applied not only to the logistics center but also to other types of warehouses, buildings, or residences, and is not limited thereto. Additionally, in the present disclosure, the term "discharge of energy" refers to consumption of electricity to operate various devices and equipment, including an HVAC (Heating, Ventilation, and Air Conditioning) system and a lighting system within the logistics center.

In some embodiments, the data collection server 100 may collect data necessary for managing energy within the energy management system 10. The collected data may include historical data (or past data), real-time data, and forecast data (or prediction data) regarding the logistics center. The data collection server 100 may include a processor and a memory similar to the processor 210 and the memory 220 described below.

In some embodiments, the historical data may include at least one of power usage data by period (e.g., by year, season, date, or time), external temperature data by period, and HVAC (or air conditioner) setting temperature data by period.

In some embodiments, the real-time data may include at least one of current external temperature data, current internal temperature data, real-time humidity data, real-time energy storage system data, and real-time power usage data.

In some embodiments, the forecast data may include at least one of energy consumption forecast data, solar power generation forecast data, and time-specific cloud forecasts.

The energy management server 200 may predict energy consumption and solar power generation in the logistics center, calculate prediction accuracy of the predicted energy consumption and solar power generation, update a peak power based on the calculated prediction accuracy, and determine an energy operation guide based on the updated peak power.

In some embodiments, the energy management server 200 may include a processor 210 and a memory 220.

The processor 210 may generally control operations of the energy management server 200. The memory 220 may store an energy management program 300 and information necessary to execute the energy management program 300.

In some embodiments, the energy management program 300 may refer to software containing programmed instructions to predict energy consumption and solar power generation in the logistics center, calculate the prediction accuracy of the predicted energy consumption and solar power generation, update the peak power based on the calculated prediction accuracy, and determine the energy operation guide based on the updated peak power.

The processor 210 may load the energy management program 300 and the information necessary for execution of the energy management program 300 from the memory 220 to execute the energy management program 300. By executing the energy management program 300, the processor 210 may predict the energy consumption and solar power generation of the logistics center, calculate the prediction accuracy, update the peak power based on the calculated prediction accuracy, and determine an energy operation guide based on the updated peak power. The functions and/or operations of the energy management program 300 will be described in detail through FIG. 2.

Meanwhile, for convenience in description in the present disclosure, the data collection server 100 and the energy management server 200 are described as separate devices included in the energy management system 10, are not limited thereto. In some embodiments, the data collection server 100 and the energy management server 200 may be implemented as detailed modules with distinct functions within a single device, or the energy management system 10 may include only the energy management server 200, with the data collection server 100 corresponding to an external server of the energy management system 10.

Detailed Operation of the Energy Management System

Figure 2:
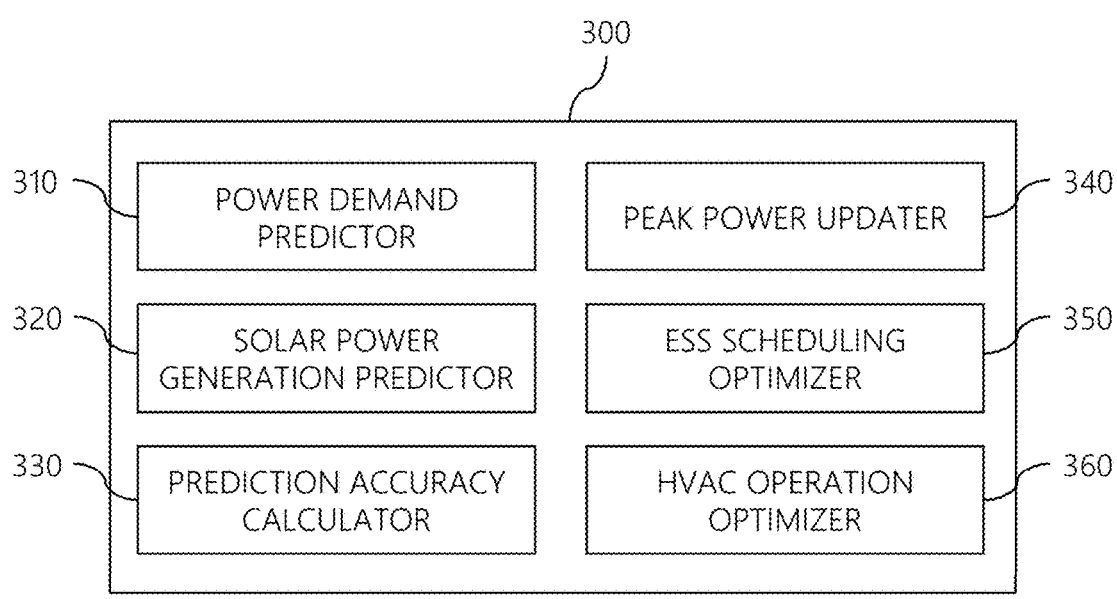
FIG. 2 is a block diagram conceptually showing functions of an energy management program according to an embodiment.
Figure 3A:
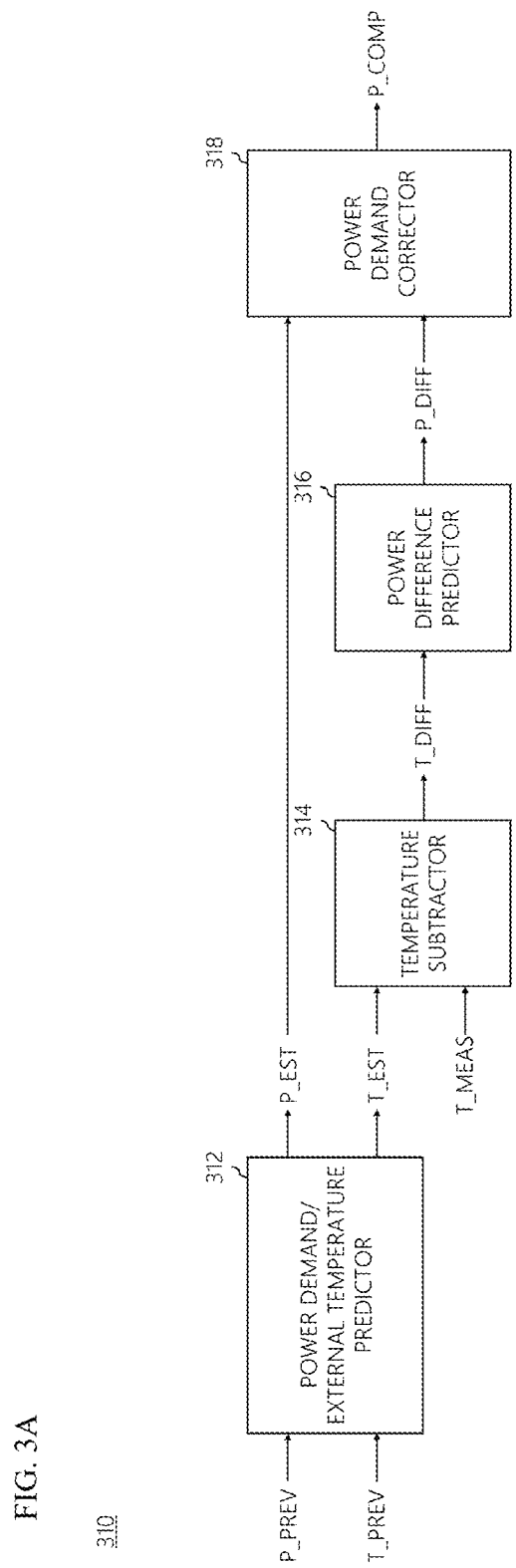
FIG. 3A is a block diagram conceptually illustrating a power demand predictor according to an embodiment.

FIG. 2 is a block diagram conceptually showing functions of an energy management program according to an embodiment, and FIG. 3A is a block diagram conceptually illustrating a power demand predictor according to an embodiment.

Referring to FIGS. 1 and 2, the energy management program 300 may include a power demand predictor 310, a solar power generation predictor 320, a prediction accuracy calculator 330, a peak power updater 340, an ESS scheduling optimizer 350, and an HVAC operation optimizer 360.

The power demand predictor 310, the solar power generation predictor 320, the prediction accuracy calculator 330, the peak power updater 340, the ESS scheduling optimizer 350, and the HVAC operation optimizer 360 shown in FIG. 2 are merely conceptual divisions of functions of the energy management program 300 for ease of explanation and are not limited thereto. In other words, according to the embodiments, at least one of the functions of the power demand predictor 310, the solar power generation predictor 320, the prediction accuracy calculator 330, the peak power updater 340, the ESS scheduling optimizer 350, and the HVAC operation optimizer 360 may be merged or separated, and may be implemented as a series of instructions within a single program.

In some embodiments, the power demand predictor 310 may predict power demand using historical external temperature data and historical power usage data. More specifically, the power demand predictor 310 may predict future power demand and a future external temperature based on the historical external temperature data and the historical power usage data, determine a difference in the predicted future power demand using the predicted future external temperature and an actual external temperature, and calculate a corrected power demand value by adjusting the predicted future power demand with the determined difference.

Referring further to FIG. 3A, the power demand predictor 310 may include a power demand/external temperature predictor 312, a temperature subtractor 314, a power difference predictor 316, and a power demand corrector 318.

The power demand/external temperature predictor 312 may receive historical external temperature data (T_PREV) and historical power usage data (P_PREV) as inputs, and may predict future external temperature (T_EST) and future power demand (P_EST).

In some embodiments, the power demand/external temperature predictor 312 may include at least one pre-trained AI (Artificial Intelligence) model (for example, a time-series prediction model such as LSTM (Long Short-Term Memory)) trained to predict future external temperature (T_EST) and future power demand (P_EST) based on the historical external temperature data (T_PREV) and the historical power usage data (P_PREV).

In some embodiments, the term "historical" the historical external temperature data (T_PREV) and the historical power usage data (P_PREV) may refer to a certain "point in time (or time point)" in the past, but may also refer to a "period" in the past. Further, in some embodiments, the term "future" in the future external temperature (T_EST) and the future power demand (P_EST) may refer to a certain "point in time" in the future, but may also refer to a "period" in the future.

In some embodiments, an AI model may be pre-trained to output a future external temperature for training external temperature data by inputting the training external temperature data for a specified past period as input data and inputting measured external temperature data for a future period following the specified past period as ground truth data. In some embodiments, an AI model may be pre-trained to output a future power demand for training power usage data by inputting the training power usage data for a specified past period as input data and inputting measured power usage data for a future period following the specified past period as ground truth data.

In some embodiments, the power demand/external temperature predictor 312 may include two AI models, one for predicting the future external temperature and one for predicting the future power demand, or it may include a single AI model that predicts both future external temperature and future power demand.

In some embodiments, the temperature subtractor 314 may calculate a difference between the predicted future external temperature (T_EST) and the measured current external temperature (T_MEAS) to generate an external temperature difference value (T_DIFF). For example, if the predicted future external temperature (T_EST) is external temperature data for a future period, the temperature subtractor 314 may calculate the difference between the predicted external temperature at the current time within the future period and the measured current external temperature (T_MEAS) to generate the external temperature difference value (T_DIFF).

In some embodiments, the power difference predictor 316 may use the external temperature difference value (T_DIFF) to predict a power demand difference value (P_DIFF), which corresponds to a difference between the predicted future power demand (P_EST) and the actual power demand. To achieve this, the power difference predictor 316 may include a pre-trained AI model (for example, an MLP (Multilayer Perceptron)) that, upon receiving the external temperature difference value (T_DIFF) as input, may predict the power demand difference value (P_DIFF).

In some embodiments, the AI model may be pre-trained to output a training power demand difference value corresponding to a training external temperature difference value by inputting as input data the training external temperature difference value, which is a difference between a future external temperature previously predicted at a specified past period and a measured external temperature for a future period following the specified past period, and inputting as ground truth data a difference between a power demand previously predicted at the specified past period and a measured power demand for the future period following the specified past period.

The power demand corrector 318 may correct the future power demand (P_EST) predicted by the power demand/external temperature predictor 312 using the power demand difference value (P_DIFF) output by the power difference predictor 316, and may output a corrected power demand value (P_COMP) as a final predicted power demand.

Referring again to FIG. 2, according to an embodiment of the present disclosure, the solar power generation predictor 320 may predict time-specific solar radiation using time-specific cloud forecasts (e.g., clear, partly cloudy (or partial), overcast) and may predict time-specific solar power generation based on the predicted time-specific solar radiation.

Figure 3B:
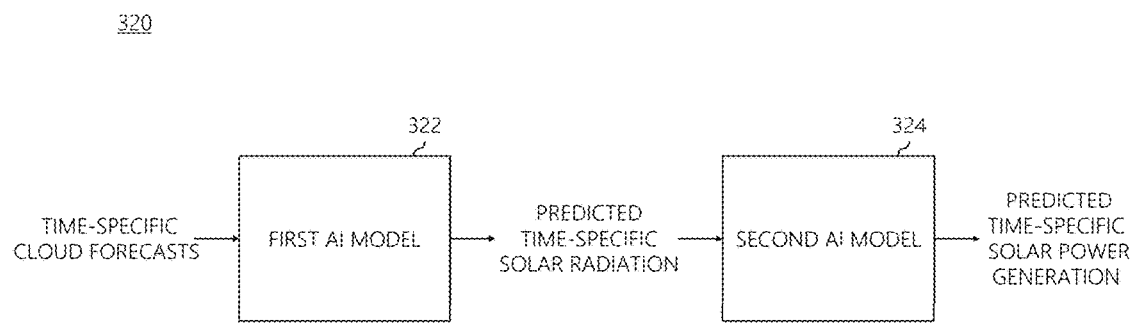
FIG. 3B shows an exemplary structure of a solar power generation predictor 320 according to an embodiment.

FIG. 3B shows an exemplary structure of a solar power generation predictor 320 according to an embodiment. Referring to FIG. 3B, the solar power generation predictor 320 may include a first AI model 322 pre-trained to cluster time-specific solar radiation by receiving time-specific cloud forecasts as input and predict time-specific solar radiation. Further, the solar power generation predictor 320 may further include a second AI model 324 pre-trained to predict time-specific solar power generation based on the time-specific solar radiation predicted by the pre-trained first AI model 322.

However, the first AI model 322 and the second AI model 324 may not be separately distinguished, and a single model may be used. Alternatively, only one of the models may be used, and either time-specific solar radiation prediction or time-specific solar power generation prediction may be performed by a rule-based or statistical method. Thus, the specific structure of the solar power generation predictor 320 is not limited thereto.

Referring again to FIG. 2, in some embodiments, the prediction accuracy calculator 330 may calculate accuracy of the power demand prediction and accuracy of the solar power generation prediction. Specifically, the prediction accuracy calculator 330 may calculate the accuracy of the power demand prediction by the power demand predictor 310 using a power demand correction value and the future power demand and may calculate the accuracy of the solar power generation prediction by the solar power generation predictor 320 using the predicted solar radiation obtained through clustering and actual solar radiation.

To examine the method for calculating the accuracy of the power demand prediction in detail, the prediction accuracy calculator 330 may calculate the accuracy of the power demand prediction based on Equation 1.

$$ACC_p^t = 1 - \frac{P\_COMP^t}{P\_EST^t} \quad \text{[Equation 1]}$$

Here, $ACC_p^t$ represents the accuracy of the power demand prediction at time t (for example, one day prior), $P\_COMP^t$ represents the power demand correction value at time t, and $P\_EST^t$ may represent the predicted future power demand at time t.

That is, the prediction accuracy calculator 330 may calculate the accuracy of the power demand prediction by using a ratio of the power demand correction value to the future power demand.

Furthermore, to examine the method for calculating the accuracy of the solar power generation prediction in detail, the prediction accuracy calculator 330 may calculate a Mean Squared Error (MSE) between the clustered solar radiation and the actual solar radiation and may calculate the accuracy of the solar power generation prediction by comparing the calculated MSE with a preset reference value.

In some embodiments, the prediction accuracy calculator 330 may determine the case where the calculated MSE is less than or equal to a preset threshold value Cload as true '1', and the case where the calculated MSE exceeds Cload as false '0', and may calculate the accuracy of the solar power generation prediction by applying the determined result to Equation 2 below.

$$ACC_{cloudy} = \frac{TP_{cloudy} + TN_{cloudy}}{TP_{cloudy} + FP_{cloudy} + FP_{cloudy} + FN_{cloudy}} \quad \text{[Equation 2]}$$

$$ACC_{partial} = \frac{TP_{partial} + TN_{partial}}{TP_{partial} + FP_{partial} + FP_{partial} + FN_{partial}}$$

$$ACC_{sunny} = \frac{TP_{sunny} + TN_{sunny}}{TP_{sunny} + FP_{sunny} + FP_{sunny} + FN_{sunny}}$$

Here, $ACC_{cloudy}$ represents the accuracy of the solar power generation prediction when the cloud forecast is 'cloudy', $ACC_{partial}$ represents the accuracy of the solar power generation prediction when the cloud forecast is 'partly cloudy (or partial)', and $ACC_{sunny}$ represents the accuracy of the solar power generation prediction when the cloud forecast is 'sunny'. $TP_X$ (where x is cloudy, partial, or sunny) indicates the case when the cloud forecast is x, the predicted value is true, and the actual value is also true. $TN_X$ represents the case when the cloud forecast is x, the predicted value is false, and the actual value is also false. $FP_X$ represents the case when the cloud forecast is x, the predicted value is true, but the actual value is false. $FN_X$ represents the case when the cloud forecast is x, the predicted value is false, but the actual value is true.

For example, if the time-specific cloud forecasts are [cloudy, partly cloudy, sunny, partly cloudy, sunny] and $ACC_{cloudy}$ is 0.84, $ACC_{partial}$ is 0.94, and $ACC_{sunny}$ is 0.99, the accuracy of the solar power generation prediction may be determined as [0.84, 0.94, 0.99, 0.94, 0.99].

Referring to FIG. 2, in some embodiments, the peak power updater 340 may update a peak power of energy supplied to the logistics center by utilizing the accuracy of the power demand prediction and the accuracy of the solar power generation prediction.

More specifically, the peak power updater 340 may apply a preset ratio constant to the accuracy of the power demand prediction and the accuracy of the solar power generation prediction to determine a stability constant that ensures stability according to the accuracy of the predictions, and may update the existing peak power to a new peak power by applying the determined stability constant.

For example, the peak power updater 340 may apply the accuracy of the power demand prediction and the accuracy of the solar power generation prediction to Equation 3 to update the peak power.

$$\beta = \alpha \cdot ACC_T^t + (1-\alpha) \cdot ACC_p^t \quad \text{[Equation 3]}$$

$$P_{new-peak}^t = \beta \cdot P_{peak}^t$$

Here, β represents the stability constant for ensuring stability based on the accuracy of the power demand prediction and the accuracy of the solar power generation prediction, α represents the preset ratio constant that is a real number between 0 and 1, $ACC_T^t$ represents the accuracy of the solar power generation prediction at time t, $ACC_p^t$ represents the accuracy of the power demand prediction at time t, t represents an integer between 1 and 24 indicating the time, $P_{peak}^t$ represents the existing peak power, and $P_{peak}^t$ may represent the updated peak power.

In some embodiments, the ESS scheduling optimizer 350 may optimize the charging and discharging scheduling of an Energy Storage System (ESS) based on the updated peak power.

More specifically, the ESS scheduling optimizer 350 may optimize the charging and discharging scheduling of the ESS based on energy usage cost, the updated peak power, and a state of charge of the ESS.

For example, the ESS scheduling optimizer 350 may optimize the charging and discharging scheduling of the ESS based on a preset scheduling optimization criterion (or standard).

In some embodiments, the scheduling optimization criterion may include at least one of: i) a first criterion that a current state of charge should be similar to a previous state of charge, ii) a second criterion that prevents complete discharge and complete charge, iii) a third criterion that minimizes the energy usage cost, and iv) a fourth criterion that total power usage should be less than or equal to the updated peak power.

For example, the first criterion may be represented by Equation 4, the second criterion may be represented by Equation 5, the third criterion may be represented by Equation 6, and the fourth criterion may be represented by Equation 7.

$$(SoC^t - SoC^{t-1})^2 \to 0 \quad \text{[Equation 4]}$$

$$SoC_{min} \le SoC^t \le SoC_{max} \quad \text{[Equation 5]}$$

$$\min \sum_{t=1}^{24} (P_{net-load}^t + P_{ess}^t) \quad \text{[Equation 6]}$$

$$P_{new-peak}^t \ge P_{net-load} \quad \text{[Equation 7]}$$

Here, $SoC^t$ represents the state of charge of the ESS at time t, $SoC^{t-1}$ represents the state of charge of the ESS at time (t−1), $SoC_{min}$ represents the state of charge of the ESS when fully discharged, $SoC_{max}$ represents the state of charge of the ESS when fully charged, $P_{net-load}^t$ represents the total power used by devices or equipment within the logistics center (excluding the ESS), and $P_{new-peak}^t$ may represent the updated peak power at time t.

In some embodiments, the HVAC operation optimizer 360 may optimize the operation of the HVAC system within the logistics center based on the updated peak power.

More specifically, the HVAC operation optimizer 360 may optimize the operation of the HVAC system based on the updated peak power and set temperature of the HVAC system.

For example, the HVAC operation optimizer 360 may optimize the operation of the HVAC system based on a preset operation optimization criterion.

In some embodiments, the operation optimization criterion may include at least one of: i) a fifth criterion that the total power used within the logistics center should be less than the updated peak power, and ii) a sixth criterion that the set temperature of the HVAC system should satisfy a preset temperature condition.

For example, the fifth criterion may be represented by Equation 8, and the sixth criterion may be represented by Equation 9.

$$P_{new-peak}^t \ge P_{except} + P_{ESS} + P_{HVAC} \quad \text{[Equation 8]}$$

$$T_{low} \le T_{set} \le T_{high} \quad \text{[Equation 9]}$$

Here, $P_{new-peak}^t$ represents the updated peak power at time t, $P_{except}$ represents the power usage of devices (or equipment) within the logistics center excluding the ESS and the HVAC system, $P_{ESS}$ represents the power usage of the ESS, $P_{HVAC}$ represents the power usage of the HVAC system, $T_{set}$ represents the set temperature of the HVAC system, $T_{low}$ represents the preset minimum temperature of the HVAC system, and $T_{high}$ may represent the preset maximum temperature of the HVAC system.

In some embodiments, the HVAC operation optimizer 360 may determine whether to optimize the operation of the HVAC system based on the optimization of the charging and discharging scheduling of the ESS.

For example, the HVAC operation optimizer 360 may optimize the operation of the HVAC system when the ESS scheduling optimizer 350 has optimized the charging and discharging scheduling of the ESS, yet the total power usage within the logistics center (e.g., the total power used by other devices excluding the ESS) exceeds the updated peak power.

Figure 4:
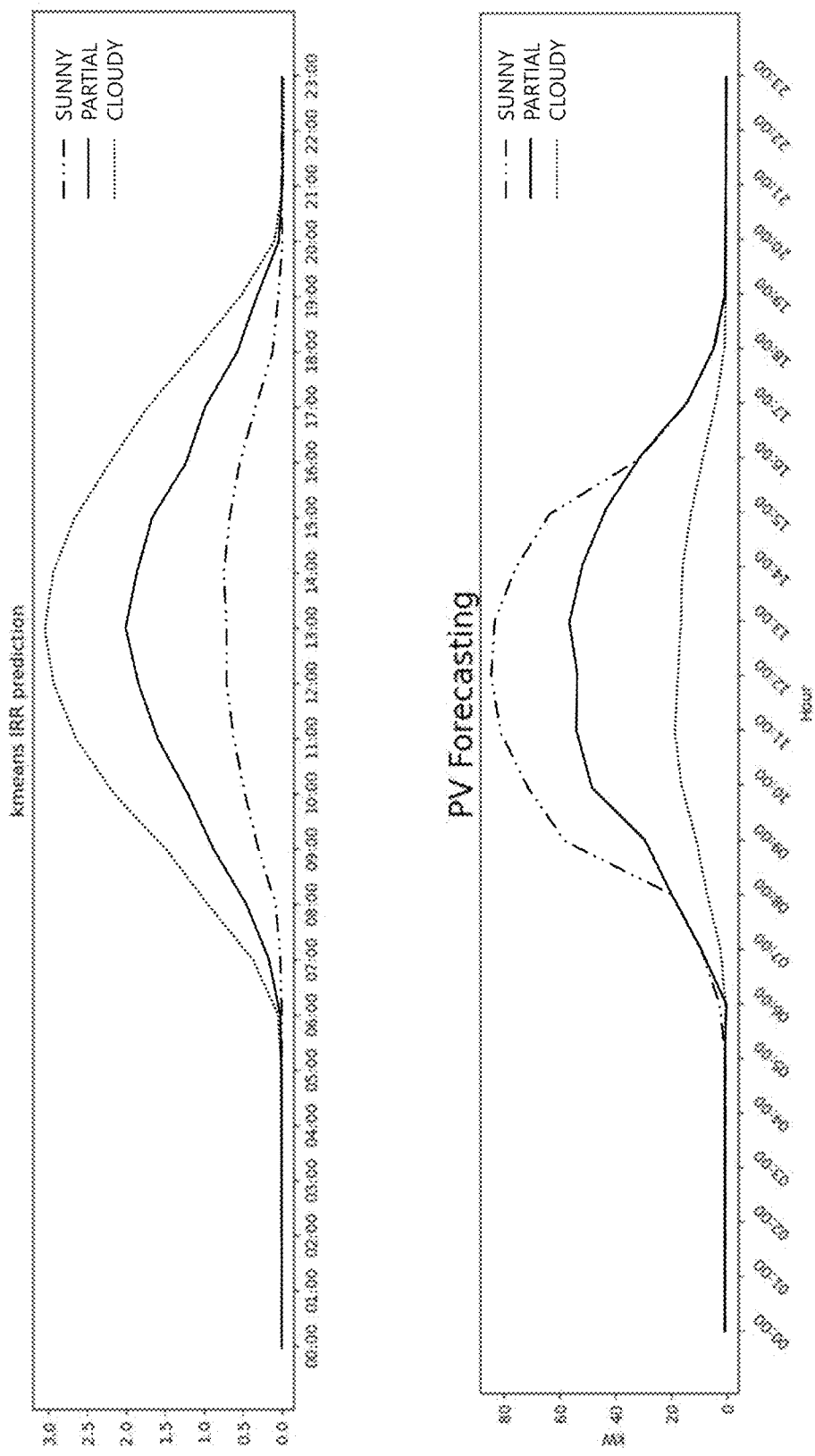
FIG. 4 illustrates a solar power generation predictor clustering time-specific solar radiation and predicting solar power generation according to an embodiment.

FIG. 4 illustrates a solar power generation predictor clustering time-specific solar radiation and predicting solar power generation according to an embodiment.

Referring to FIGS. 2 and 4, the solar power generation predictor 320 may cluster solar radiation into one of seven groups—Group 1 (0.0), Group 2 (0.5), Group 3 (1.0), Group 4 (1.5), Group 5 (2.0), Group 6 (2.5), or Group 7 (3.0)—on an hourly basis by inputting time-specific cloud forecasts into a pre-trained AI model, and then may predict time-specific solar power generation based on the clustered solar radiation.

As seen in FIG. 4, the solar power generation predictor 320 may cluster the data into groups with higher values as the forecasted cloud amount increases (sunny→partly cloudy→cloudy), and predict that solar power generation will be lower in the groups with higher values.

Figure 5:
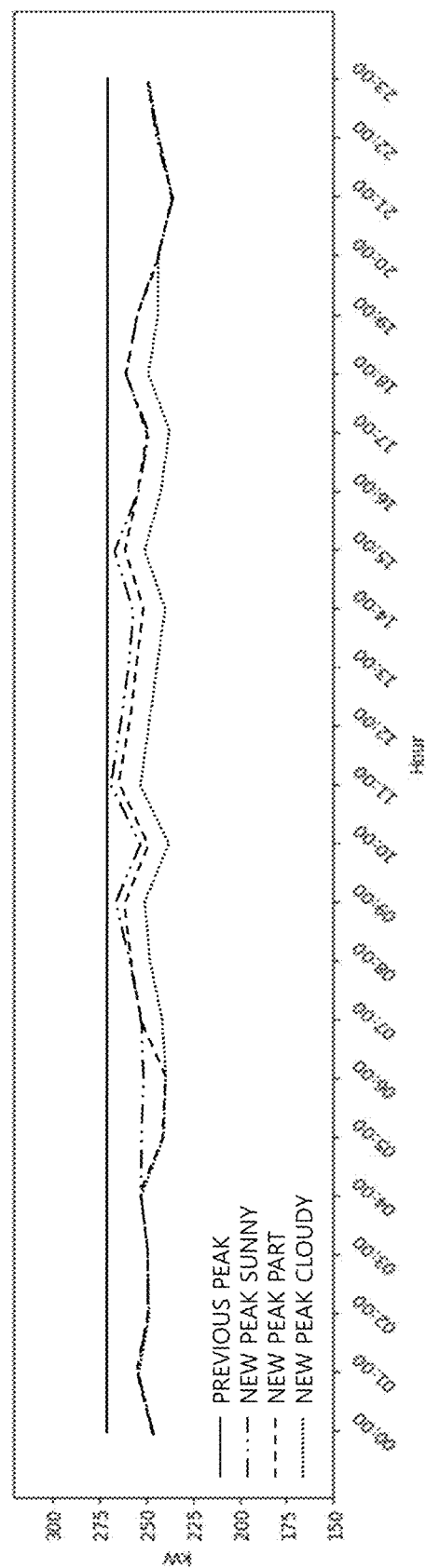
FIG. 5 illustrates a peak power updater updating a peak power based on accuracy of prediction for solar power generation according to an embodiment.

FIG. 5 illustrates a peak power updater updating a peak power based on accuracy of prediction for solar power generation according to an embodiment.

Referring to FIGS. 2 and 5, the existing peak power was set as a constant value regardless of the weather (i.e., cloud amount) (line of 'previous peak'). However, the peak power updater 340 updates the peak power based on the accuracy of the solar power generation prediction derived from the time-specific cloud forecasts (lines of 'new peak sunny', 'new peak part, and 'new peak cloudy), resulting in different values of the updated peak power depending on the cloud amount (e.g., showing a tendency to have lower values as the cloud amount increases).

In other words, by updating the peak power based on cloud forecasts, the peak power updater 340 allows the energy management system 10 to reflect weather changes in real-time, thereby enabling more efficient energy management within the logistics center.

Figure 6:
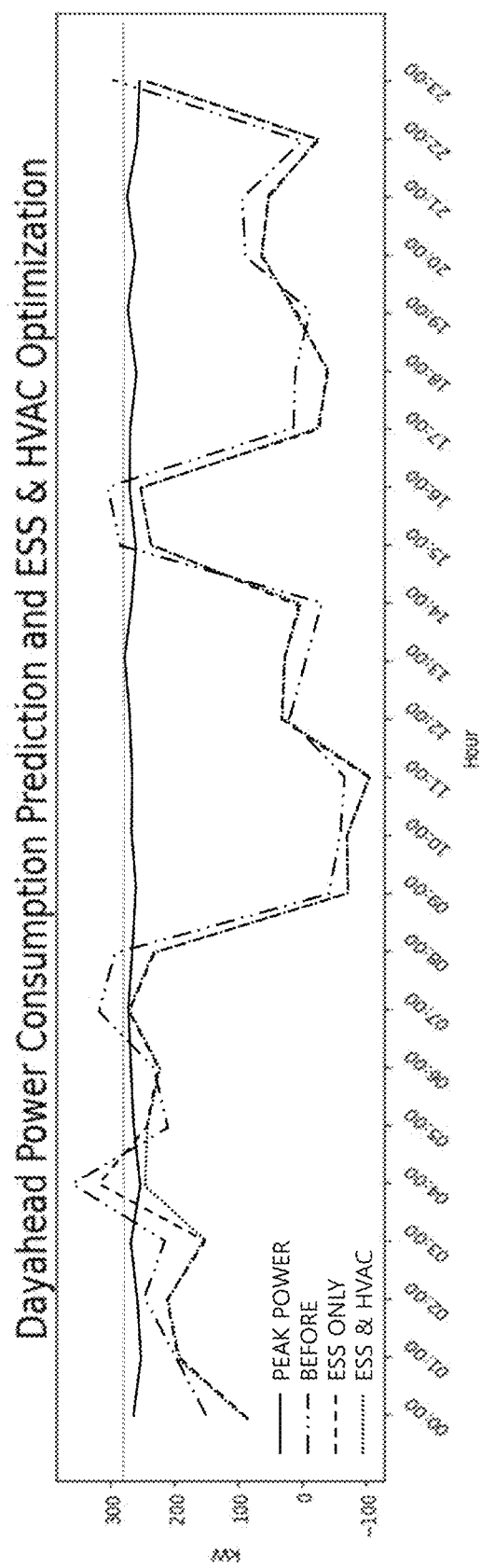
FIG. 6 shows the difference in power consumption of logistics center before applying energy management method according to an embodiment and after applying the energy management system according to an embodiment.

FIG. 6 illustrates the difference in power consumption of a logistics center between applying a conventional energy management system and applying the energy management system according to an embodiment.

Referring to FIGS. 2 and 6, each line represents i) the peak power, ii) the power consumption of the logistics center before applying the energy management method of the energy management system 10, iii) the power consumption of the logistics center when the energy management system 10 performs only the optimization of charging and discharging scheduling of the ESS, and iv) the power consumption of the logistics center when the energy management system 10 performs both optimization of charging and discharging scheduling of the ESS and optimization of the operation of the HVAC system.

As shown, in case of a logistics center using a conventional energy management method, there are multiple points where power consumption exceeds the peak power, posing risks related to power supply and safety within the logistics center.

In contrast, by performing optimization of charging and discharging scheduling of the ESS, the energy management system 10 according to an embodiment is able to mostly adjust the power consumption of the logistics center to remain below the peak power, thereby reducing risks related to power supply and safety within the logistics center.

However, when the energy management system 10 performs only the optimization of charging and discharging scheduling of the ESS, there were still some intervals where the power consumption of the logistics center exceeded the peak power. By performing both optimization of charging and discharging scheduling of the ESS and optimization of the operation of the HVAC system, the energy management system 10 is able to adjust the power consumption of the logistics center to remain below the peak power. Thus, the energy management system 10 may conduct energy management in a stable and efficient manner by reducing risks related to power supply and safety within the logistics center while also lowering energy usage costs.

Energy Management Method of the Logistics Center

Figure 7:
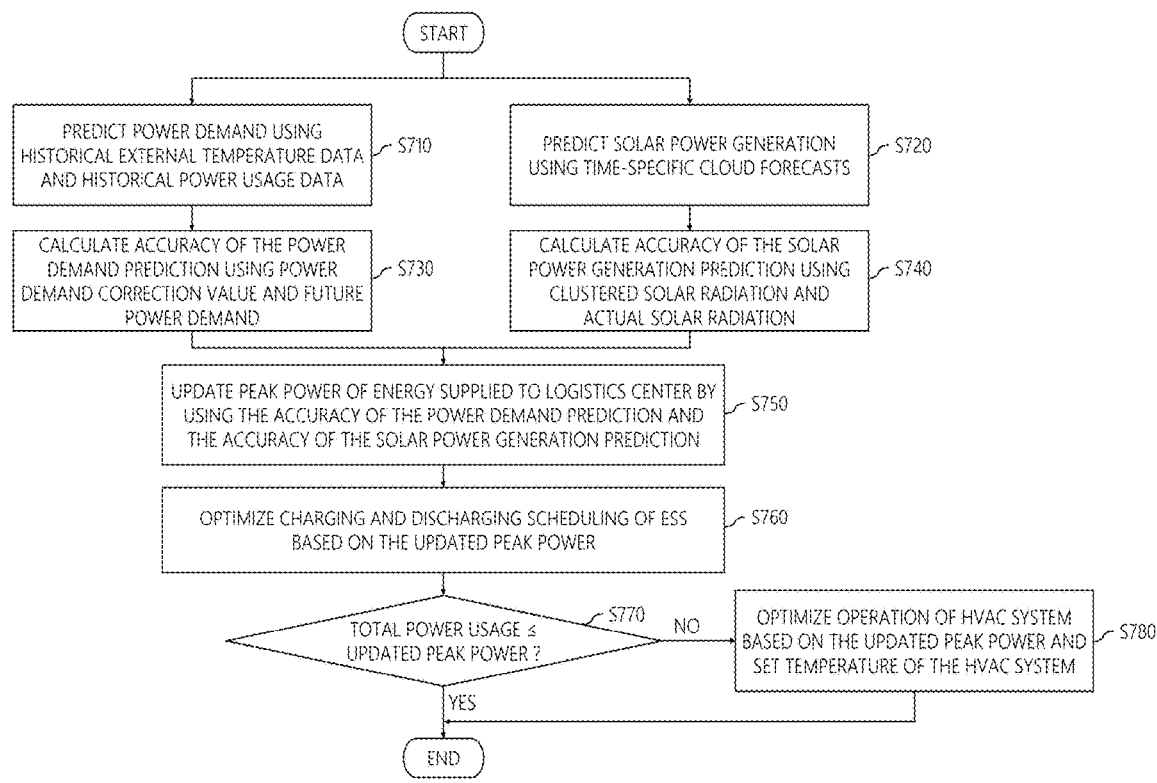
FIG. 7 is a flowchart illustrating an energy management method of a logistics center according to an embodiment.

FIG. 7 is a flowchart illustrating an energy management method of a logistics center according to an embodiment.

Referring to FIGS. 2 and 7, the power demand predictor 310 may predict power demand using historical external temperature data and historical power usage data (S710). The solar power generation predictor 320 may predict solar power generation using time-specific cloud forecasts (S720).

The prediction accuracy calculator 330 may calculate the accuracy of the power demand prediction using the power demand correction value and future power demand (S730). The prediction accuracy calculator 330 may calculate accuracy of the solar power generation prediction using the clustered solar radiation and the actual solar radiation (S740).

The peak power updater 340 may update the peak power of the energy supplied to the logistics center by using the accuracy of the power demand prediction and the accuracy of the solar power generation prediction (S750). The ESS scheduling optimizer 350 may optimize the charging and discharging scheduling of the ESS based on the updated peak power (S760).

It may be determined whether the total power usage exceeds the updated peak power (S770). If the total power usage still exceeds the updated peak power even after optimizing charging and discharging scheduling of the ESS (S770, 'No'), the HVAC operation optimizer 360 may optimize the operation of the HVAC system based on the updated peak power and the set temperature of the HVAC system (S780).

In some embodiments, by updating the peak power based on the accuracy of the power demand prediction and the accuracy of the solar power generation prediction, it is possible to determine the peak power optimized for the real-time conditions of the logistics center.

Further, in some embodiments, by updating the peak power to optimize it for the real-time conditions of the logistics center, the energy management system may perform energy management more stably.

In addition, in some embodiments, based on the updated peak power, it is possible to manage the energy used in the logistics center more efficiently by performing not only optimization of the charging and discharging scheduling of the ESS but also optimization of the operation of the HVAC system.

Computer-Readable Recording Medium

It is apparent that each step or operation according to embodiments of the present disclosure may be performed by a computer including one or more processors, in response to the execution of a computer program stored on a computer-readable recording medium.

Each instruction stored on the above-described recording medium may be implemented through a computer program programmed to perform each corresponding step. Such a computer program may be stored on a computer-readable recording medium and may be executed by the processor. The computer-readable recording medium may be a non-transitory readable medium. Here, the term "non-transitory readable medium" refers to a medium that permanently stores data, as opposed to a medium that stores data for a short period, such as a register, cache, or memory, and can be read by a device. Specifically, programs for performing the various methods described above may be stored and provided on non-transitory readable media, such as semiconductor memory devices, including erasable programmable read-only memory (EPROM), electrically erasable programmable read-only memory (EEPROM), and flash memory devices, as well as magnetic disks such as internal hard disks and removable disks, optical-magnetic disks, and non-volatile memory such as CD-ROM and DVD-ROM disks.

The methods according to various examples disclosed in this document may be provided as a computer program product. The computer program product may be distributed in the form of a machine-readable storage medium (e.g., compact disc read-only memory (CD-ROM)) or online via an application store (e.g., Play Store™). In the case of online distribution, at least part of the computer program product may be temporarily stored or temporarily generated on a storage medium, such as memory on the manufacturer's server, the application store's server, or an intermediate server.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

In some embodiments, each component or a combination of two or more components described with reference to FIG. 1 to FIG. 7 may be implemented with digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, LED (light-emitting diode) monitor, OLED (organic LED) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

DESCRIPTION OF REFERENCE CHARACTERS

10: Energy management system
100: Data collection server
200: Energy management server
300: Energy management program
310: Power demand predictor
320: Solar power generation predictor
330: Prediction accuracy calculator
340: Peak power updater
350: ESS scheduling optimizer
360: HVAC operation optimizer

What is claimed is:

1. An energy management system for peak power management and energy efficiency improvement in a logistics center, comprising:
    a data collection server configured to collect data for performing energy management of the logistics center; and
    an energy management server configured to;
    (i) predict power demand of the logistics center and solar power generation within the logistics center based on the collected data;
    (ii) calculate a first accuracy of power demand prediction by comparing the predicted power demand with the collected data;
    (iii) cluster time-specific solar radiation by inputting time-specific cloud forecasts included in the collected data into a pre-trained artificial intelligence model;
    (iv) calculate a mean squared error (MSE) between the clustered time-specific solar radiation and actual solar radiation;
    (v) calculate a second accuracy of the solar power generation prediction based on a comparison of the MSE with a preset reference value;
    (vi) determine a second peak power based on an existing first peak power, the first accuracy, the second accuracy, a first constant applied to the first accuracy, and a second constant applied to the second accuracy, wherein a sum of the first and second constants is 1; and
    (vii) control at least one of charging and discharging scheduling of an Energy Storage System (ESS) and operation of an air conditioning system within the logistics center based on the second peak power.

2. The energy management system of claim 1, wherein the energy management server is further configured to:
    optimize the charging and discharging scheduling of the ESS based on a preset scheduling optimization criterion,
    wherein the preset scheduling optimization criterion comprises at least one of:

a first criterion that a current state of charge is similar to a previous state of charge, a second criterion of preventing complete discharge and complete charge, a third criterion of minimizing energy usage cost, and a fourth criterion that total power usage within the logistics center is less than or equal to the second peak power.

3. The energy management system of claim 2, wherein the energy management server is further configured to:

optimize the operation of the air conditioning system so as to satisfy a preset operation optimization criterion if the preset scheduling optimization criterion fails to meet the fourth criterion, wherein the operation optimization criterion comprises at least one of:

a fifth criterion that total power usage within the logistics center is less than the second peak power, and a sixth criterion that set temperature of the air conditioning system meets a preset temperature condition.

4. An energy management method performed by an energy management system for peak power management and energy efficiency improvement in a logistics center, comprising:

(i) predicting power demand of the logistics center and solar power generation within the logistics center based on collected data;

(ii) calculating a first accuracy of power demand prediction by comparing the predicted power demand with the collected data;

(iii) clustering time-specific solar radiation by inputting time-specific cloud forecasts included in the collected data into a pre-trained artificial intelligence model;

(iv) calculating a mean squared error (MSE) between the clustered time-specific solar radiation and actual solar radiation;

(v) calculating a second accuracy of the solar power generation prediction based on a comparison of the MSE with a preset reference value;

(vi) determining a second peak power based on an existing first peak power, the first accuracy, the second accuracy, a first constant applied to the first accuracy, and a second constant applied to the second accuracy, wherein a sum of the first and second constants is 1; and (vii) controlling at least one of charging and discharging scheduling of an Energy Storage System (ESS) and operation of an air conditioning system within the logistics center based on the second peak power.

* * * * *